United States Patent [19]

Murray

[11] Patent Number: 4,849,171

[45] Date of Patent: Jul. 18, 1989

[54] CORROSION INHIBITION OF SODIUM AND CALCIUM CHLORIDE

[76] Inventor: Bruce Murray, 28 Willow Grove, Irvine, Calif. 92714

[21] Appl. No.: 20,947

[22] Filed: Feb. 9, 1987

[51] Int. Cl.$^4$ .............................................. C23F 11/08
[52] U.S. Cl. ........................................ 422/7; 252/387; 252/389.2; 252/389.22; 422/12; 422/13; 422/18
[58] Field of Search ......................... 422/7, 18, 13, 12; 252/389.2, 389.22, 387, 70; 407/307–309, 311

[56] References Cited

U.S. PATENT DOCUMENTS

| | | | |
|---|---|---|---|
| 2,096,736 | 10/1937 | Dinley | 252/387 |
| 2,597,406 | 5/1952 | Thome-Johannesen | 423/307 |
| 2,900,222 | 8/1959 | Kahler . | |
| 2,980,620 | 4/1961 | Hatch . | |
| 2,988,509 | 6/1961 | Schilberg . | |
| 3,029,127 | 4/1962 | Pollitzer . | |
| 3,215,637 | 11/1965 | Clerbois . | |
| 3,248,249 | 4/1966 | Collins . | |
| 3,313,650 | 4/1967 | Raeuber . | |
| 3,432,428 | 3/1969 | Wirth, Jr. et al. | 422/18 |
| 3,542,686 | 11/1970 | Miller . | |
| 3,589,858 | 6/1971 | Ralston | 422/18 |
| 3,630,752 | 12/1971 | Scott, Jr. et al. | 422/12 |
| 3,933,459 | 1/1976 | Moore et al. | 422/41 |
| 4,448,702 | 5/1984 | Kaes | 252/76 |
| 4,512,907 | 4/1985 | McConnell . | |
| 4,668,416 | 5/1987 | Neal . | |

FOREIGN PATENT DOCUMENTS

| | | |
|---|---|---|
| 1459642 | 1/1969 | Fed. Rep. of Germany . |
| 1459664 | 1/1969 | Fed. Rep. of Germany . |
| 1351943 | 3/1963 | France .................................. 422/18 |
| 482488 | 6/1977 | U.S.S.R. . |
| 1536660 | 12/1978 | United Kingdom . |
| 1555468 | 11/1979 | United Kingdom . |

OTHER PUBLICATIONS

The Encyclopedia of Chemistry, 3rd Ed., pp. 835–836.
Riegel's Handbook of Industrial Chemistry, 7th Ed., p. 557.

Primary Examiner—Barry S. Richman
Assistant Examiner—Timothy M. McMahon
Attorney, Agent, or Firm—Plante, Strauss, Vanderburgh

[57] ABSTRACT

A corrosion inhibited sodium and calcium chloride composition preferably in granular form, which is uniformly coated with a minute to minor quantity of an inhibitor comprising chiefly superphosphate and a minor amount of magnesium oxide. There is also disclosed a method for inhibiting corrosion of sodium and calcium chloride which comprises supplying to the metal surface which is exposed to corrosive attack by sodium and calcium chloride, a minute quantity of an inhibitor comprising chiefly superphosphate and a minor amount of magnesium oxide. The magnesium oxide functions to cement the inhibitor as a tenacious coating on the salt granules, and also to enhance the effectiveness of the phosphate corrosion inhibition.

5 Claims, No Drawings

CORROSION INHIBITION OF SODIUM AND CALCIUM CHLORIDE

BACKGROUND OF THE INVENTION

1. Field Of The Invention

This invention relates to a corrosion inhibitor for sodium and calcium chloride brines, and in particular to corrosion inhibitor which can be added to granular sodium and calcium chloride.

2. Brief Statement Of The Prior Art

Sodium and calcium chloride are widely used industrial chemicals. Perhaps the most commonly observed application of sodium and calcium chlorides is the use of these salts as a road cover in freezing climates, where their high solubility effects a significant depression of the freezing point of water, melting ice and snow on the surfaces to which it is applied. Other applications of significant volume are the use of calcium chloride as a curing accelerator in concrete, as an additive in drilling muds to control density and clay flocculation; as a drainage aid in paper mills, as a high density liquid used as ballast in tractor tires, and as a desiccant in refrigeration plants.

A common problem experienced in the various applications of sodium and calcium chloride is that the salts promote corrosive attack on metal surfaces. The corrosiveness of sodium and calciuim chloride brines is particularly troublesome in the road cover applications where the brine which is splashed on the undersurfaces of cars can cause rapid corrosion and deterioration of the under panels and rocker panels of a car. Since modern car manufacturing techniques have almost universally adopted unitized construction for weight and manufacturing efficiencies, any corrosive attack of brines on the undersurfaces of automobiles is particularly troublesome as the deterioration of such surfaces by corrosion is often not economically repairable. Additionally, these salts are often transported as saturated brine solutions in pipeline, and their corrosiveness to steel presents a significant problem to such handling.

The use of calcium chloride brines in other applications such as for concrete accelerators or as additives to drilling muds also creates serious corrosion problems. Most construction concrete is reinforced with steel bars which are embedded in the concrete and the presence of calcium chloride in the concrete accelerates corrosive attack of the reinforcing steel. The calcium chloride in drilling muds causes an accelerated corrosion of well tubing and equipment used in oil drilling applications. The use of calcium chloride as a drainage aid in the paper industry has been limited by the corrosive nature of its solutions.

The problem of accelerated corrosion by sodium and calcium chloride brines is thus a problem which has not, heretofore, been adequately addressed by the prior art. Some solutions to the problem have included the substitution of other salts such as calcium or magnesium acetates or chromates for the road cover applications. These substitutions are not satisfactory because of a prohibitively high cost and because of potentially adverse effects on the environment.

Ideally, any corrosion inhibitor used with sodium and calcium chlorides should be effective at extremely low concentrations to minimize environmental problems and should be colorless to avoid staining or discoloring of metal surfaces, wearing apparel and the like which come in contact with brine solutions of sodium or calcium chloride. The inhibitor should be effective over a very wide range of concentrations, particularly when applied for inhibiting corrosion of brines used in road covers since the brines which are formed by melting of ice and snow in the presence of sodium and calcium chloride can be expected to have an extremely wide range of concentration of the sodium and calcium chloride. The inhibitor should also be soluble over the wide range of concentrations anticipated in its application. Finally, the inhibitor should be compatible with the sodium and calcium chloride manufacturing process and permit the manufacture of granular and corrosion inhibited sodium and calcium chloride without any significant effect on the granulation process.

BRIEF STATEMENT OF THE INVENTION

This invention comprises a composition of sodium and calcium chloride which contains an effective and minor content of a corrosion inhibitor. Preferably the composition comprises a mixture of sodium or calcium chloride and the inhibitor in proportions from one part inhibitor to between about 15 and 100 parts sodium or calcium chloride. The inhibitor is a mixture of superphosphate, and magnesium oxide, in an amount from 0.1 to about 0.35 parts magnesium oxide per part of phosphate.

The invention also comprises a method of manufacture of granular sodium or calcium chloride in which an effective and minor content of a corrosion inhibiting mixture of superphosphate and magnesium oxide is incorporated as a coating on sodium or calcium chloride granules. In the preferred method, the granules of salt, either sodium or calcium chloride, or mixtures thereof, are moistened with the addition of from 0.5 to 3 weight percent of a saturated brine, i.e., a saturated solution of sodium or calcium chloride. Thereafter the finely subdivided inhibitor mixture is added in the aforementioned proportions. The inhibitor mixture contains magnesium oxide and granules of superphosphate in the aforementioned proportions. This method is effective to coat the salt granules.

DESCRIPTION OF PREFERRED EMBODIMENTS

This invention comprises a corrosion inhibited composition of sodium or calcium chloride, or mixtures thereof, preferably in granular form, which contains a corrosion inhibitor at a weight ratio of inhibitor to sodium or calcium chloride from one part per 15 to 100 parts of the sodium or calcium chloride. Preferably, the weight ratio of the inhibitor to the sodium and calcium chloride is one part per 17 to about 75 parts sodium or calcium chloride, and, most preferably, is one part inhibitor per 50 parts of sodium or calcium chloride.

The invention can be applied to inhibition of corrosion of sodium and calcium chloride brines, by the direct addition of the inhibitor to those brines, or by the addition of the inhibitor to the dry salt, so that the inhibitor becomes available when the salts are dissolved in water. In an application for the inhibition of corrosion of metal parts of cars, trucks and other vehicles which are contacted by road salt and brine, the inhibitor is preferably applied to the dry salts prior to the application of the salts to the road or street. In typical road and street applications, approximately 400 to 800 pounds of salt, either sodium chloride or calcium chloride or mixtures thereof, are applied per mile of a road or street which is about 20 feet wide. This is usually sufficient to meet most ice and snow conditions, e.g., up to about 0.1 inch of ice and 1 inch of snow at temperatures of about 10° to about 25° F. The salt settles to the pavement and forms brine which prevents bonding of the ice or snow to the pavement. In heavy traffic, the loose snow and ice is melted by frictional heat from traffic, or is removed by snow plows and blowers.

In other applications, such as prevention of corrosion of metal surfaces contacted by concentrated brine solutions, e.g., pipelines in which the brines are transported, the inhibitor of the invention is directly added to the brine at the aforementioned percentage of the dry weight of salt in the brine.

The inhibitor is a mixture of superphosphate and magnesium oxide in weight proportions of 0.1 to 0.35 parts magnesium oxide per part of superphosphate. As will be explained hereinafter, it is believed that the compositions of the invention form a passivating film which consists of an insoluble sodium and calcium phosphate, most probably an insoluble calcium orthophosphate. The magnesium oxide controls the pH and ensures optimum conditions for the formation of the protective, insoluble calcium phosphate film.

Superphosphate is a source of phosphate that is commonly used in the fertilizer industry. It is acidulated phosphate rock which is prepared by the addition of sulfuric acid to ground phosphate rock. It commonly contains at least 25 weight percent available (water soluble) phosphate. It has an acid pH value, typically from 2.5 to about 3.5, and contains insoluble calcium sulfate and calcium hydrogen phosphate.

The sodium and calcium chloride employed in the invention can be obtained from any suitable commercial source. A convenient source of calcium chloride is the brine obtained by the neutralization of spent hydrochloric acid with limestone. Such brines are available with salt concentrations from about 15 to about 40 weight percent, usually from 25 to about 35 weight percent. The sodium chloride can be commercially produced salt, usually obtained by solar evaporation from salt ponds. These sodium and calcium chloride brines are preferably preconcentrated to obtain a saturated brine, e.g., from 40 to about 50 percent salt content, to which the inhibitor composition can be added.

When the inhibitor is added to aqueous solutions of the salt, it is added in the aforesaid weight proportions, based on the dry weight of the salt in the solution.

The brines as previously described, can contain a congeneric content of calcium carbonate. Since calcium carbonate can cause subsequent processing problems and inefficient utilization of the phosphate, it is preferred that these brines also be pretreated, prior to the granulation of the calcium chloride, to reduce, or eliminate entirely, the carbonates. This can be accomplished by acidification of the brine with a strong mineral acid, preferably hydrochloric acid, reducing the pH of the brine to approximately 8.5 which decomposes the carbonates and liberates carbon dioxide. Thereafter, the brines can be processed to prepare granules of sodium or calcium chloride, e.g., by evaporative concentration and crystallization.

In the preferred method, as applied to granular sodium or calcium chloride, the granular salts are premoistened by the application of from about 1 to 3 weight percent of a saturated solution of the salt which is being treated. Thereafter, or simultaneously, the corrosion inhibitor is added as a dry mixture to the premoistened sodium or calcium chloride granules by dry blending the inhibitor with granules of sodium and calcium chloride in conventional mixing equipment, such as double cone mixers, rotating drum mixers, etc. Alternatively, the salt can be obtained in a moist condition, e.g., calcium chloride is obtained as moist granules containing from 77 to about 80 weight percent water and can be directly coated with the inhibitor of the invention, or can be partially dried to a moisture content of from 2 to about 10 weight percent prior to addition of the inhibitor composition.

The inhibitor is added in quantities sufficient to achieve the aforementioned weight proportion of inhibitor to sodium and calcium chloride.

The anhydrous sodium and calcium chloride is commonly produced in granular condition with particle size from about 3/16 to about ¼ inch. Preferably, the inhibitor is employed as a finely subdivided powder with a particle size passing a screen of 100, preferably of 250, and most preferably of 325 mesh. It has been observed that the magnesium oxide very favorably affects the distribution and stability of the inhibitor throughout the salt granules. The magnesium oxide apparently reacts with the saturated brine which is used to premoisten the granules and binds the inhibitor composition as a very uniform and tenacious coating on the salt granules. It is believed that these reactions proceed as follows:

$$Na^+ + Cl^- + Ca(H_2PO_4)_2 + MgO + H_2O = NaCl \cdot Ca(H_2PO_4) \cdot Mg(OH)_2$$

$$Ca^{++} + 2Cl^- + Ca(H_2PO_4) + MgO + H_2O = CaCl_2 \cdot Ca(H_2PO_4)_2 \cdot Mg(OH)_2$$

The product of this reaction forms as a very tenacious coating on the surface of the granules and resists separation from the granules during storing and handling of the inhibited product.

If desired, a physical mixture of powdered sodium and calcium chloride and the inhibitor mixture of superphosphate and magnesium oxide in the aforementioned weight proportions can also be extruded to compact the inhibitor in the anhydrous sodium and calcium chloride particles. In this application, the sodium and calcium chloride and from 1 to 3 weight percent brine, and the aforementioned proportions of the inhibitor are blended in a powdered condition, e.g., as powders having size ranges passing a 10 mesh, preferably passing a 100 mesh U.S. Standard screen, and are then compacted in a dry powder extruder into extrudates having sizes, typically from 3/16 to about ⅜ inch.

The corrosion inhibition of brines obtained from the sodium and calcium chloride compositions of the invention is achieved by the mechanisms set forth in the following paragraphs:

The corrosion of a metal surface with a brine solution typically proceeds in accordance with the following reaction:

$$Fe^{++} + \tfrac{1}{2}O_2 + H_2O = Fe^{++} + 2OH^-$$

As apparent from the preceding equation, the corrosive attack results in solution of the metal, liberating electrons and forming hydroxyl ions. Typically, the pH of the brine surrounding the cathodic area of the metal surface rises significantly, from neutrality to a value of approximately 9.5 in the instance where an iron or steel surface is corroded. This rise in the pH, in the presence of an excess quantity of calcium ions and a sufficient concentration of soluble phosphate ions, particularly orthophosphate ions results in the following equation:

$$4Ca^{++} + Mg^{++} + 3H_2PO_4^- + 7OH^- = Ca_4Mg(PO_4)_3OH + 6H_2O$$
$$3Ca^{++} + 2H_2PO_4^- + 4OH^- = Ca_3(PO_4)_2 + 4H_2O$$

The resultant orthophosphate precipitate is very insoluble and forms a passivating film over the cathodic surface of the metal, isolating it from further corrosive attack. The reaction could be quite complex and other insoluble phosphate salts or complexes could also be present. The precipitation of the insoluble phosphate film is controlled by the solubility constant of the above reactions. At an ambient temperature and alkaline pH, and in the presence of an excess quantity of calcium cations, even a trace of orthophosphate is converted to the insoluble phosphate film.

Besides its function in cementing the inhibitor as a tenacious coating on the salt granules, the magnesium oxide also participates in the corrosion inhibition in several ways. It functions by providing a buffering action and neutralizes any free acid, to a pH of 8.4. It also functions to react with any carbon dioxide, or carbonic acid. Brine frequently contains other cations, e.g., $Ca^{++}$, $Mg^{++}$, and anions such as $HCO_3^-$, $H_2PO_4^-$ and $HPO_4^{--}$. These other ions also promote the formation of the aforementioned insoluble calcium magnesium phosphate at the cathode surface. Additionally, the elevated pH which results from the magnesium oxide also favors formation of very insoluble tricalcium phosphate as an insoluble film on the metal surface.

The protective films are apparent from their colors, e.g., the film formed by the calcium magnesium phosphate is a blue-yellow film which forms on steel immersed in the inhibited sodium chloride brines. The tricalcium phosphate film appears as a thin grey precipitate on steel immersed in inhibited calcium chloride brines. In either case, corrosion is effectively inhibited.

The inhibitor is stable and soluble in sodium and calcium chloride brines at pH values from 4.8 to about 8.5, and at sodium and calcium chloride concentrations up to 10 weight percent. When the pH value rises above the aforementioned range, however, the phosphate in the inhibitor will precipitate and form a protective film on the metal surface under the corrosive attack.

The insoluble phosphate film is formed only at the corrosively active locality where the necessary pH conditions and availability of hydroxyl ions is achieved for the formation of this precipitate, thus conserving the active soluble phosphate and permitting its effective use at very low concentrations.

The following experiments describe the corrosion inhibition which is achieved with the sodium and calcium chloride and soluble phosphate solutions of the invention.

EXAMPLE 1

In this experiment, precorroded, mild steel coupons, one inch by three inches, 1/16 inch thick were cleaned, dried and weighed, and each of the coupons were placed in a beaker, partially filled with an aqueous solution of the salt. The coupons were rotated in the aqueous solutions at 20 rpm. throughout the test.

The salts were used at a concentration of 10 grams per liter, with and without the inhibitor. The inhibitor, when present, was at a concentration of 0.48 grams per liter, and comprised a mixture of one part magnesium oxide per four parts (by weight) of superphosphate. The coupons were removed, dried and weighed after 1, 2 and 4 days immersion in the test solutions, and the results which were obtained for sodium and calcium chloride salt solutions were as follows:

TABLE 1

| | Weight Loss Rate (MDD)* | | |
|---|---|---|---|
| Days Of Exposure | One Day | Two Days | Four Days |
| 1. NaCl (control) | −41.3 | −35.5 | −31.3 |
| 2. NaCl + inhibitor | 0.0 | +0.9 | +0.2 |
| 3. CaCl$_2$ (control) | −42.2 | −37.6 | −33.4 |
| 4. CaCl$_2$ + inhibitor | +1.8 | +2.5 | +1.5 |

*Values reported as milligrams loss per square decimeter per day

The preceding data evidence a very high degree of corrosion inhibition in that the very aggressive corrosion rates of the sodium chloride and calcium chloride were effectively eliminated and the coupons were entirely passive to the solutions.

In a similar test, conducted at solution concentrations of 100 grams per liter with only twice the concentration of the inhibitor (0.96 grams/liter), the coupons exhibited no weight loss after one day of exposure.

Similar results were obtained when aluminum test coupons, magnesium test coupons and zinc test coupons were substituted for the mild steel coupons in the reported experiment.

EXAMPLE 2

In this experiment, varied concentrations of magnesium oxide were included with superphosphate as the inhibitor for sodium chloride solutions. The same general procedure used in Example 1 was also used in this experiment. The sodium chloride brine had a salt concentration of 30 grams and 0.5 grams superphosphate per liter. The magnesium oxide was used in increasing increments of concentration in five test solutions. The pH values, and the corrosion results are reported in the following table:

TABLE 2

| Mag. oxide (gms.) | 0 | 0.05 | 0.10 | 0.25 | 0.50 |
|---|---|---|---|---|---|
| pH (after 15 min) | 3.76 | 5.74 | 6.20 | 7.27 | 8.10 |
| Weight loss* | −.0009 | +.0007 | .0015 | +.0019 | +.0017 |

*Total weight change after 24 hours for test coupons weighing 10.5 to 10.9 grams The test data evidence that magnesium oxide functions to enhance the corrosion inhibition of superphosphate, as the weight loss of the coupons responded remarkably to the presence of the magnesium oxide, and the net weight gain of the samples in which magnesium oxide was included evidenced the formation of a deposit on the steel coupons.

EXAMPLE 3

In a similar experiment, the inhibitor mixture of 5 weight parts of superphosphate and 1 weight part of magnesium oxide was used in varied amounts in a brine solution containing 30 grams salt per liter. Cleaned, precorroded mild steel coupons with net weights of 10.5 to 10.9 grams were tested in separate beakers of the brine contained varied concentrations of the inhibitor mixture, and the one-day weight losses were determined for each solution. The following results were obtained:

TABLE 3

| Inhibitor (gms) | 0 | 0.12 | 0.24 | 0.36 | 0.48 | 0.60 |
|---|---|---|---|---|---|---|
| Weight loss | −.0061 | −.0035 | +.0002 | +.0006 | +.0011 | +.0014 |

The data evidence a very high degree of effectiveness of the inhibitor, which very rapidly decreased the corrosiveness of the brine solution, until the corrosion was eliminated at an inhibitor concentration of about 0.2 grams per liter.

EXAMPLE 4

A large number of steel coupons were immersed in inhibited brine solutions for a period of 24 hours. The coupons were then removed, dried and treated with 0.1 N sulfamic acid to dissolve any film or surface deposits. The resultant solutions were analyzed for calcium, magnesium and phosphate contents, and the results were as follows, for each of the test solutions reported in Example 3:

TABLE 4

| Inhibitor (gms) | 0 | 0.12 | 0.24 | 0.36 | 0.48 | 0.60 |
|---|---|---|---|---|---|---|
| Calcium (ppm) | trace | 3 | 7 | 10 | 13 | 15 |
| Magnesium (ppm) | 0 | 2 | 2 | 3 | 3 | 4 |
| Phosphate (PO$_4$) | 0 | 74 | 140 | 210 | 280 | 340 |

The data indicate that the deposit on the steel coupons was a phosphate which contained increasingly greater amounts of calcium and magnesium, as the coupons was a phosphate which contained increasingly greater amounts of calcium and magnesium, as the inhibitor concentration increased. The deposit is also readily visible, as it appears as a blue-yellow uniform coating on steel coupons after one day immersion in the inhibited sodium chloride brines, and as an uniform grey coating on steel coupons after one day immersion in inhibited calcium chloride brines.

EXAMPLE 5

The ease with which salt granules can be uniformly coated with the inhibitor can be demonstrated in a laboratory experiment in which 75 grams of calcium chloride granules and 75 grams of sodium chloride granules are placed in separate beakers, and 3.2 grams of a saturated calcium chloride and saturated sodium chloride brine, respectively, are added to each beaker to premoisten the granules. After briefly stirring the granules, five grams of the dry mixture of 1 part magnesium oxide to 4 parts superphosphate are added. The resultant mixture is agitated by stirring for a brief period, about 2 minutes, and it is observed that the granules in the beakers acquire a uniform coloration, with the sodium chloride granules appearing slightly off-white, and the calcium chloride granules appearing grey. The inhibitor powder disappears entirely, and all the granules in each beaker acquire a very uniform color and appearance.

The invention has been described with reference to the illustrated and presently preferred embodiment. It is not intended that the invention be unduly limited by this disclosure of the presently preferred embodiment. Instead, it is intended that the invention be defined, by the reagents, and steps, and their obvious equivalents, set forth in the following claims:

What is claimed is:

1. The method of inhibiting the corrosion of metal surfaces by brines of salts selected from the group consisting of sodium and calcium chlorides which comprises:

a. incorporating in said brines an inhibitor mixture consisting essentially of magnesium oxide and superphosphate in weight proportions from 0.1 part magnesium oxide per part superphosphate, in a weight amount of 1 part inhibitor mixture per 100 to 400 parts of said salt, sufficient to inhibit the corrosion of said brines on metal surfaces.

2. The method of claim 1 wherein said inhibitor is present in an amount from one part per 175 to about 250 parts of said salt.

3. The method of claim 1 wherein said inhibitor is present in an amount from one part per 200 parts of said salt.

4. The method of claim 1 including the step of dispersing said inhibitor composition in said brines in a sufficient quantity to provide sufficient superphosphate to form a passivating film on said metal surface.

5. The method of claim 4 as applied to the prevention of corrosion wherein said metal surfaces are the metal surfaces of vehicles exposed to calcium chloride brines formed from calcium chloride applied to road surfaces as a cover.

* * * * *